United States Patent
Schmidt

(10) Patent No.: US 6,490,566 B1
(45) Date of Patent: Dec. 3, 2002

(54) GRAPH-BASED SCHEDULE BUILDER FOR TIGHTLY CONSTRAINED SCHEDULING PROBLEMS

(75) Inventor: Craig W. Schmidt, Somerville, MA (US)

(73) Assignee: i2 Technologies US, Inc., Dallas, TX (US)

(*) Notice: Subject to any disclaimer, the term of this patent is extended or adjusted under 35 U.S.C. 154(b) by 0 days.

(21) Appl. No.: 09/305,580

(22) Filed: May 5, 1999

(51) Int. Cl.[7] .......................... G06F 17/60; B22D 11/16
(52) U.S. Cl. ............................. 705/8; 705/9; 706/13; 706/62; 700/100; 700/104
(58) Field of Search .................. 705/8; 706/13, 706/62; 709/102, 103, 106; 716/8; 700/121, 100, 104

(56) References Cited

U.S. PATENT DOCUMENTS

| | | | | |
|---|---|---|---|---|
| 5,319,781 A | | 6/1994 | Syswerda | 395/650 |
| 5,511,158 A | * | 4/1996 | Sims | 345/440 |
| 5,971,596 A | * | 10/1999 | Nishikawa | 364/489 |

FOREIGN PATENT DOCUMENTS

WO      WO-9814891 A1 * 4/1998   ......... G06F/15/18

OTHER PUBLICATIONS

Lawler et al. The Traveling Salesman Problem. Wiley, 1985, pp. 28,29, 108–115.*
Mehlhorn. Graph Algorithms and NP–Completeness. New York: Springer–Verlag, 1984, p. 1–27.*
Sandnes et al. Improved static multiprocessor scheduling using cyclic task graphs: a genetic approach. Advances in Parallel Computing, Sep. 19–22, 1997, v12, p. 703–710.*
Fang et al. A genetic algorithm to hot strip mill rolling scheduling problems.. In Proceedings IEEE Conference on Tools with Artificial Intelligence, Nov. 10–12, 1998, pp. 264–271.*
Woo et al. Task scheduling in distributed computing systems with a genetic algorithm. High Performance Computing on the Information Superhighway, 1997. HPC Asia '97 , 1997, pp.:301–305.*
Coli et al. Global execution time minimization by allocating tasks in parallel systems. Proceedings Euromicro Workshop on Parallel and Dustributed Processing, 1995, pp. 91–97.*
Matsuda et al. Optimization of order allocation to in–stock slabs by genetic algorithm. Transactions of the Society of Instrument and Control Engineers, Japan, 1997, pp. 118–126 (abstracts only).*

* cited by examiner

*Primary Examiner*—Kyle J. Choi
*Assistant Examiner*—D. Robertson
(74) *Attorney, Agent, or Firm*—Baker Botts L.L.P

(57) ABSTRACT

A computer-implemented system (10) for task scheduling. The system (10) models an enterprise in terms of products, tasks and resources used to make them, and constraints imposed in scheduling tasks. A scheduling engine, comprised of a genetic algorithm (13) and a schedule builder (14), operates on the model to produce candidate schedules. The schedule builder (14) uses graph theory techniques to solve tightly constrained scheduling problems. Each candidate schedule is evaluated and used to generate an improved schedule in accordance with genetic processing, until a best schedule is produced.

27 Claims, 1 Drawing Sheet

GRAPH-BASED SCHEDULE BUILDER FOR TIGHTLY CONSTRAINED SCHEDULING PROBLEMS

TECHNICAL FIELD OF THE INVENTION

This invention relates to computer implemented management for business enterprises, and more particularly to a system and method for scheduling resources.

BACKGROUND OF THE INVENTION

Computer-implemented scheduling systems are increasingly being used in factories and other enterprises. Such systems model the enterprise environment and provide schedules for producing items to fulfill consumer demand within the constraints of the environment.

Typically, a scheduling problem can be represented as a constrained optimization problem. For example, consider the problem of sequencing a set of tasks on a single resource in a manufacturing environment. Assume each task has a deadline and that the objective is to schedule each task so that it is completed by its deadline. One way to view this problem is as a search in a space of start times. Under this view, the problem is a constrained optimization problem in which the variables are the start times, the constraint is that no tasks can overlap, and the objective is not missing deadlines.

Constraints may be categorized into "hard" and "soft" constraints. Hard constraints are those that are not to be violated. Soft constraints may be violated, but at the expense of some penalty or cost. One approach to scheduling is to first determine a candidate schedule that does not violate hard constraints, and then to evaluate that schedule in terms of soft constraint violations. This process continues until a "best" schedule is obtained.

Some scheduling problems can be described as being "tightly constrained". These problems typically have many possible solutions, but have only a few solutions that do not violate hard constraints. The process of searching for candidate schedules can be tedious and consume much processing time.

SUMMARY OF THE INVENTION

One aspect of the invention is a computer-implemented method of scheduling tasks, the tasks having associated hard constraints. A genetic algorithm is used to generate an initial task permutation. This task permutation is represented as a directed graph, whose nodes are the tasks and whose edges are determined by the constraints. Given two arbitrary tasks, an edge exists in the corresponding nodes of the graph if the first task can be placed directly before the second task in the schedule, without violating any hard constraints. An acyclic subgraph is constructed and a long path through the subgraph is calculated, which is used to produce a candidate schedule. The quality of this schedule is evaluated, and its fitness is used as feedback to the genetic algorithm. The output schedule is the best result found during repeated iterations.

If the scheduling problem includes soft as well as hard constraints, the graph is constructed to represent only the hard constraints. Each candidate schedule produced from calculating a long path through the graph is subjected to soft constraints and evaluated in terms of soft constraint violations. The evaluation is fed back to the genetic algorithm to produce a new task permutation.

An advantage of the invention is that is an efficient method for solving tightly constrained scheduling problems. The use of graph-based processing permits hard constraints to be represented as feasible transitions between tasks and to be satisfied by heuristically finding a long path through the graph. The system would otherwise spend a great deal of effort evaluating schedules that violate hard constraints. The construction of a subgraph converts the problem of determining the longest path from a problem of NP complexity into a problem of O(E) complexity, where E is the number of edges in the graph.

DETAILED DESCRIPTION OF THE INVENTION

Overview of the Scheduling System

Figure 1:
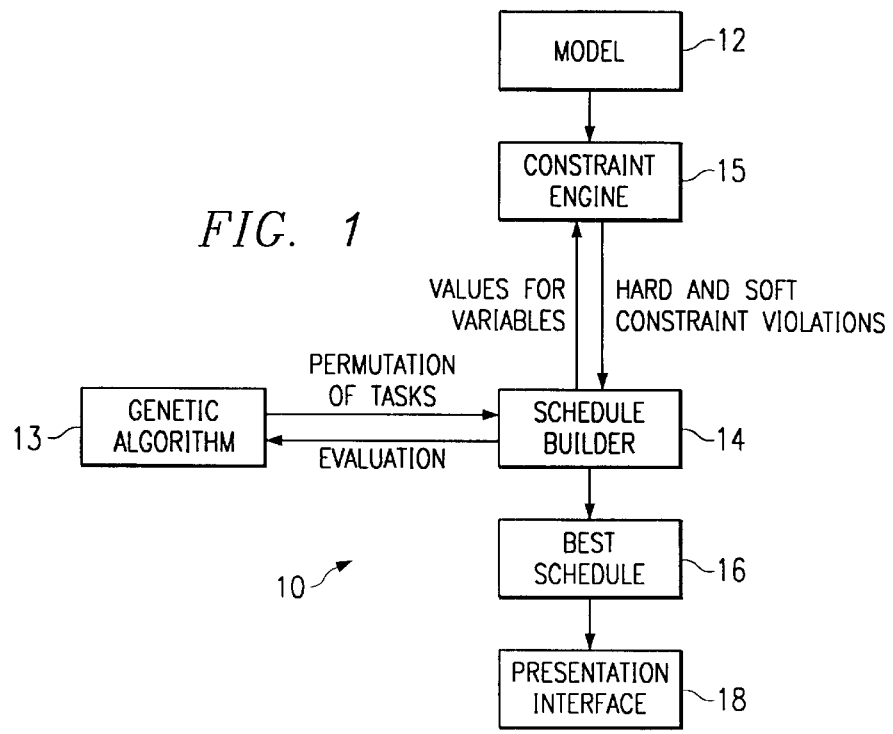
FIG. 1 illustrates a scheduling system that uses graph-based schedule building in accordance with the invention.

FIG. 1 is a block diagram of the software architecture of a computer-implemented scheduling system 10 in accordance with the invention. System 10 can be implemented on a computer having typical computer components, such as a processor, memory, storage devices, and input and output devices. During operation of the invention, the modeling and scheduling components of system 10 are maintained in active computer memory for speed and efficiency.

System 10 is used to determine schedule (a sequence of tasks), taking into account various constraints. The schedule is optimal in the sense that it is a "best" schedule in terms of minimizing soft constraint violations and avoiding any hard constraint violations.

A typical application of system 10 is for supply chain scheduling, which may include scheduling for assembly lines, job shops, or make-to-order production. However, the invention is applicable to any type of scheduling problem. For purposes of example, this description is in terms of providing schedules for mill runs of a steel mill production enterprise.

One component of system 10 is a model 12 of the enterprise whose tasks are being scheduled. Model 12 models the enterprise in terms of the various physical entities involved in the scheduling process. The various entities of model 12 include tasks, resources, and constraints.

In the example of this description, model 12 is of an enterprise comprised of a single plant—a steel mill. However, it should be understood that the enterprise whose activities are being scheduled could extend over more than a single site or business entity.

Model 12 is comprised of a number of model types, each with associated attributes. Each model type is used to define model instances. For example, a product model type is used to define various product models, each of which represents a product proposal, that is, a product that the enterprise might produce.

A task model type defines task models, each of which represents a task required to develop a given product. A resource model type defines resource models, each of which represent a resource. The various constraints and goals of the enterprise are also a part of model 12. This model 12 is implemented in a constraint engine 15. It is possible to input values for scheduling decisions into the constraint engine 15, and to receive hard and soft constraint violations resulting from making these decisions.

As explained below, genetic algorithm 13 and schedule builder 14 use model 12 and constraint engine 15 to generate schedules. In the example of this description, genetic algorithm 13, schedule builder 14, and constraint engine 15 are separate processes. However, system 10 could be also used with an engine that integrates the functions of all three processes. These elements of system 10 are functionally distinct, but could be collectively referred to as an "optimizing engine".

In general, as explained in further detail below, genetic algorithm 13 and schedule builder 14 cooperate in an iterative process of finding a "best" schedule. Genetic algorithm 13 provides ordered sequences of tasks. Schedule builder 14 applies constraints from constraint engine 15 to each task sequence, thereby producing a schedule. Schedule builder 14 then evaluates the schedule in terms of minimizing constraint violations, and feeds back the evaluation to the genetic algorithm 13, which then provides an improved task sequence.

This iterative process continues until the user is satisfied with a "best" schedule found during the search, in terms of minimizing constraint violations. Optimization algorithms for optimizing goals may also be applied.

A presentation interface 18 provides an interactive visualization for the user. Various views are appropriate for different aspects of the scheduling process and for different personnel. In general, "views" are displays that provide graphic representations of the model 12. Model 12 can be viewed differently for different purposes, such as when different personnel use model 12 for decision-making and monitoring relevant to their particular role in scheduling. Views can be used for both reporting and querying.

System 10 may be implemented using object-oriented techniques. Object orientation concepts provide a highly interactive user interface as well as an internal representation that fairly represents a complex enterprise.

Typically, system 10 is implemented on a network of computers, such as a client-server system. In fact, the typical application of system 10 will be as a distributed system, where various personnel at different workstations are provided with information relevant to the decisions encompassed by their job function.

A feature of system 10 is its ability to provide either incremental or global scheduling, as well as to respond to what-if hypotheses. For example, incremental scheduling might be requested if a certain aspect of the schedule has failed. System 10 can be used to provide an alternative solution. A global scheduling process provides a complete schedule, which may optimize one or more specified goals, such as profit.

Genetic Algorithm and Schedule Builder

Like conventional genetic algorithms, genetic algorithm 13 derives its behavior from a metaphor of the process of evolution. The processes in nature seem to boil down to objects competing for resources in the environment. Some objects are better equipped for survival and are more likely to survive and propagate their genetic material. In general, a genetic algorithm functions by applying operators (crossover and mutation) to a population of possible solutions referred to as "chromosomes". Crossover is analogous to the (simplified) genetic phenomenon when genetic material crosses over from one chromosome to another. The general process followed by genetic algorithm 14 is to evaluate the fitness of a set (population) of possible solutions (chromosomes). Then it creates a new population by performing operations such as crossover, reproduction, and mutation. It discards the old population and iterates using the new population.

As applied to scheduling problems, a chromosome represents a permutation of tasks that need to be scheduled. The genetic algorithm 13 provides each task permutation to the schedule builder 14, which builds a schedule and evaluates it. The evaluation is fed back to the genetic algorithm 13, which "breeds" better schedules over time by combining different chromosomes.

An example of a genetic algorithm used for computer-implemented scheduling is described in U.S. Pat. No. 5,319,781, to G. Syswerda, entitled "Generation of Schedules Using a Genetic Procedure". This algorithm could be modified for use with the schedule builder 14 of the present invention. Other variations of genetic algorithms could also be used.

Schedule builder 14 applies hard constraints, and typically also applies soft constraints, by interacting with constraint engine 15. Hard constraints must be satisfied, whereas soft constraints have a certain penalty if violated.

To build a schedule, for a given permutation of tasks in a chromosome, schedule builder 14 constructs a schedule that respects all hard constraints and attempts to minimize violations of soft constraints. Because a schedule must respect all hard constraints, some tasks may be left unscheduled. A chromosome's fitness is the total of penalties for soft constraint violations in the resulting schedule, plus a penalty for leaving tasks unscheduled.

A commercially available product that provides a genetic algorithm 13 and schedule builder 14 (without the features of the present invention) is the RHYTHM OPTIMAL SCHEDULER tool, part of the RHYTHM family of products, from i2 Technologies, Inc. These tools could be adapted to provide a schedule builder 14 in accordance with the present invention.

Tightly Constrained Scheduling

Some scheduling problems fall into a category that may be referred to as "tightly constrained". Although there are many tasks and many potential sequences, the constraints are such that the number of valid transitions from task to task is limited, and therefore only a few solutions exist.

An example of a tightly constrained scheduling problem is the scheduling of mills in the metals industry. Metal slabs must be sent through milling equipment in a particular order, to maximize the life of mill rollers. Slabs make indentations into the rollers, and these indentations can damage subsequently rolled slabs that are wider or thicker. Ideally, slabs should be scheduled in a sequence of gradually decreasing width and thickness. However, it is not always possible to sequence the slabs so that both width and thickness simultaneously decrease. As a result, small increases in one dimension are allowed, in order to allow decreases in the other dimension. These constraints are known as "pattern constraints".

A "round" is a sequence of slabs that satisfy pattern constraints specifying a maximum decrease and maximum increase in width and thickness between subsequent slabs. The pattern constraints are restrictive because they must be satisfied for both the width and thickness of the slabs. Usually, the maximum decrease in slab width is larger than the maximum increase. There may be other constraints, such as slab due dates and constraints on the grade of metal contained in a round.

Figure 2:
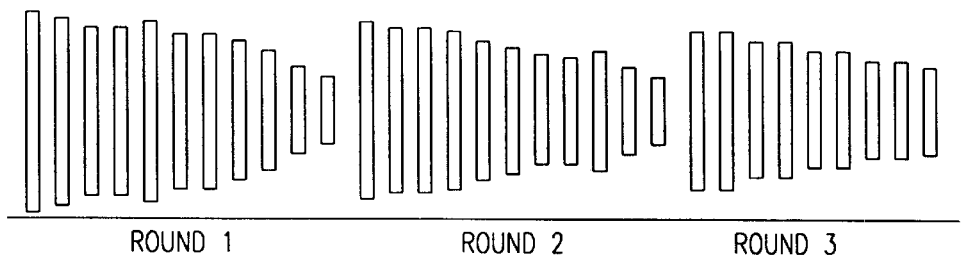
FIG. 2 illustrates three rounds of slabs (tasks) scheduled to satisfy pattern (hard) constraints.

FIG. 2 illustrates three rounds, each comprised of a number of slabs. It is desirable to have rounds that are as long (have as many slabs) as possible. Because rollers are changed between rounds, long rounds minimize the frequency of roller changes. The number of slabs per round may vary. There may be maximum and minimum limits on the total length, duration, and number of slabs in a round.

Schedule builder 14 takes slabs, empty rounds, and lines to provide a schedule. Round and lines are scheduled in a heuristic process of finding a hole (in time) among lines. A round is then chosen for the hole. The process of filling a round with slabs is performed using genetic algorithm 13 and schedule builder 14, using graph processing as explained below.

Graph Processing for Scheduling Problems

A feature of the invention is the use of graph data structures to represent scheduling problems and the use of graph algorithms to solve them. In the example of this description, the tasks represented on the graph are slabs to be rolled. The constraints are the pattern constraints that constrain the rolling sequence of slabs. The pattern constraints are considered "hard" constraints, and the graph is used to ensure that these hard constraints are not violated.

Figure 3:
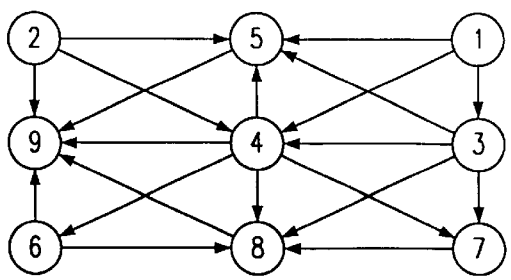
FIGS. 3 and 4 illustrate two graphs and a long path through each graph, resulting from different iterations of the genetic algorithm and schedule builder.

FIG. 3 illustrates how a scheduling problem can be represented with a graph data structure 30. Graph 30 is comprised of nodes and directed edges. Each task is a node in the graph. The edges represent relationships among the nodes, here pairwise hard constraints, meaning that the constraints dictate that any task X may directly precede, some task Y. Thus, consistent with general graph theory, the edges in a directed graph are ordered pairs; the order between the two nodes that the edge connects is important.

In the milling example of this description, each node is a slab. The constraints are hard constraints, including the pattern constraints and perhaps other hard constraints. An edge, E (i, j), exists if slab i can directly precede slab j in a round without violating a pattern constraint. The resulting graph has each node connected to one or more neighbors in each direction. The graph need not be symmetric. Because it is possible to have both increases and decreases in width in a pattern constraint, the graph may contain cycles.

As an example, assume a sample data set of 2413 slabs. An average slab can only be followed in a round by one of 28 other neighboring slabs. The resulting graph is a sparse graph, having 2413 nodes and 205,324 edges. This sparse graph represents a tightly constrained problem in that there are a relatively small number of transitions permitted between nodes.

A "valid round" is a directed path through the graph. A "long path" can be defined as a valid path (round) that traverses as many nodes (includes as many slabs) as possible subject to any specifications on path length. A long path is not necessarily the longest path —it might be any path of a maximum specified length or it might be any path over a certain threshold minimum length.

To find a long path through a directed graph with cycles, one possible method is to transform the problem into an asymmetric traveling salesman problem. An alternative method makes use of chromosomes of a genetic algorithm to construct a graph representing the tasks and constraints.

To implement the genetic algorithm method, an approximate maximum acyclic subgraph is constructed. The chromosome order of the slabs is used as a topological ordering. An edge, E(i, j), of the subgraph exists if and only if it is an edge of the graph and either slab i appears before slab j in the chromosome or i and j are in different strongly connected components of the subgraph. It follows that the subgraph is acyclic. The construction of the subgraph may also be equivalently viewed as removing an edge, E(i, j), from the graph if i is after j in the chromosome and i and j are in the same strongly connected component.

A "strongly-connected component" of a path is a maximal subset of nodes, such that an induced subgraph is strongly connected. A directed graph is strongly connected if for every pair of nodes i and j, there is a path from i to j and a path from j to i. In other words, it is possible to reach any vertex from any other vertex. This meaning is consistent with general graph theory.

Next, a long path through the subgraph is computed. This may be accomplished using standard graph algorithm techniques, such as Critical Path Method (CPM) techniques that are used to find the critical path in a project. Let $l_j$ be the length of node j. Visit the nodes in topological order and let $d_j=l_j+\max(d_i)$, where the maximum is taken over all i such that (i, j) is an edge of the subgraph. The node j with the greatest $d_j$ is the end of the long path. If each node records its predecessor node i, it is possible to "unwind" the other nodes on the long path. As the chromosome evolve over time, different long paths are found.

In FIG. 3, the chromosome has resulted in graph 30, with the nodes corresponding to task sequencing. Each node in this example is assumed to have a length of 1. The long path through graph 30 is through nodes 1, 3, 4, 6, 8, 9. Nodes 2, 5, and 7 are not included in the long path.

Figure 4:
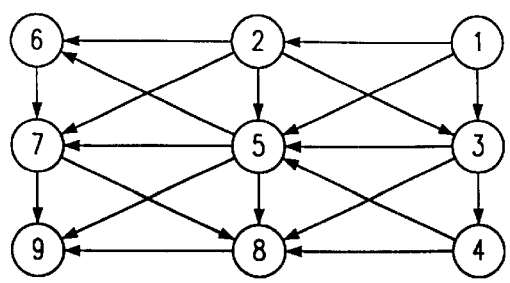

FIG. 4 illustrates a graph 40 with re-ordering of tasks within the chromosome so as to provide a longer path than that of FIG. 3. For graph 40, the long path is 1, 2, 3, 4, 5, 6, 7, 8, 9, which includes all nodes.

The permutations provided by genetic algorithm 13 are sequences of tasks. In the example illustrated by graphs 30 and 40 of FIGS. 3 and 4, there are nine tasks. Thus, each graph has nine nodes, and each permutation is a chromosome with an ordering of nine tasks. In the permutation for graph 30, the upper left node (task) is second in the chromosome ordering; whereas in the permutation for graph 40, the upper left node (task) is sixth in the chromosome ordering. There are as many permutations as there are possible numberings of the graph.

The above-described long path calculation does not consider soft constraints. If there are no soft constraints, the process of generating tasks sequences and building better schedules is repeated until the path length is sufficiently long so as to meet one or more objective specifications, such as a minimum or maximum path length.

The distribution of processing functions between the genetic algorithm 13 and schedule builder 14 might vary apart from the basic functions of providing task permutations (performed by genetic algorithm 13) and calculating a long path to satisfy constraints (performed by schedule builder 14). As stated above, this functional division is somewhat arbitrary and the processing could be integrated as a single "optimizing engine" that performs the functions of both.

If there are soft constraints, schedule builder 14 uses the long path as a guide in constructing a round that does a better job of respecting soft constraints. It takes the first empty slot in the schedule and selects a slab to fill it. This process is repeated until the schedule builder fails to find a slab to go in the next slot, or until the length of the round is maximum. It does not simply consider slabs in the order given in the chromosome; it moves gradually down the long path, selecting a set of candidate slabs that are in the neighborhood of the current location on the long path. It computes soft penalties of these candidate slabs, and assigns the best slab to the empty slot. If all the candidate slabs result in hard constraint violations, then a new long path is computed that avoids these slabs.

In this manner, for each chromosome (task permutation) provided by genetic algorithm 13, schedule builder 14 finds a long path through the graph and then minimizes soft violations of constraints. When a long path is reached that minimizes soft constraint violations, and perhaps also maximizes one or more goals, the process ends.

Other Embodiments

Although the present invention has been described in detail, it should be understood that various changes, substitutions, and alterations can be made hereto without departing from the spirit and scope of the invention as defined by the appended claims.

What is claimed is:

1. A computer system for scheduling tasks, the tasks having associated constraints, comprising:
    a genetic algorithm operable to generate task permutations representing a set of possible tasks that may be performed;
    a scheduler builder operable to use said each task permutation and said constraints to build a candidate schedule, by representing a task permutation as a directed graph, wherein transitions between tasks are determined by said constraints, by constructing an acyclic subgraph of said graph, and by calculating a long path through said subgraph, thereby providing a candidate schedule, said schedule builder further operable to determine whether said long path satisfies a path length specification;
    the long path being longer than a short path through said subgraph;
    wherein said genetic algorithm and said schedule builder interact such that, if said specification is not met, new task permutations are generated and new candidate schedules are produced, for a number of iterations; and
    an output device operable to output a schedule resulting from said iterations.

2. The system of claim 1, wherein said constraints are pairwise hard constraints.

3. The system of claim 1, wherein said constraints are hard constraints and wherein said tasks also have one or more associated soft constraints, and wherein said schedule builder is further operable to evaluate each candidate schedule in terms of violations of said soft constraints and to feed back said evaluation to said genetic algorithm.

4. The system of claim 1, wherein said acyclic subgraph is constructed such that an edge, E(i, j) of the subgraph exists only if it is an edge of said graph and either task i is before task j in said task permutation or i and j are in different strongly connected components of said subgraph.

5. The system of claim 1, wherein said long path is calculated by using critical path techniques.

6. The system of claim 1, wherein said path length specification is a minimum path length.

7. The system of claim 1, wherein said path length specification is a maximum path length.

8. A computer-implemented method of scheduling tasks, the tasks having associated constraints, comprising the steps of:
    generating an initial task permutation, using a genetic algorithm;
    representing said task permutation as a directed graph, wherein said tasks are nodes of said graph and edges between nodes are determined by said constraints;
    constructing an acyclic subgraph of said graph;
    calculating a long path through said subgraph, thereby providing a candidate schedule;
    the long path being longer than a short path through said subgraph;
    determining whether said long path satisfies a path length specification;
    if said path length specification is not met, repeating said generating, representing, constructing, calculating, and determining steps for a new task permutation, for a number of iterations; and
    outputting a schedule resulting from said iterations.

9. The method of claim 8, wherein said constraints are pairwise hard constraints.

10. The method of claim 8, wherein said constraints are hard constraints and wherein said tasks also have one or more associated soft constraints, and further comprising the step of evaluating each candidate schedule in terms of violations of said soft constraints.

11. The method of claim 8, wherein said step of constructing an acyclic subgraph is performed by constructing said subgraph such that an edge, E(i, j) of the subgraph exists only if it is an edge of said graph and either task i is before task j in said task permutation or i and j are in different strongly connected components of said subgraph.

12. The method of claim 8, wherein said step of calculating a long path is performed using critical path techniques.

13. The method of claim 8, wherein said path length specification is a minimum path length.

14. The method of claim 8, wherein said path length specification is a maximum path length.

15. A computer system for scheduling slabs to be milled, the slabs having associated pattern constraints, comprising:
    a genetic algorithm operable to generate task permutations representing a set of possible slabs to be milled;
    a scheduler builder operable to use each task permutation and said constraints to build a candidate schedule, by representing a task permutation as a directed graph, wherein transitions between tasks are determined by said constraints, by constructing an acyclic subgraph of said graph, and by calculating a long path through said subgraph, thereby providing a candidate schedule, said schedule builder further operable to determine whether said long path satisfies a path length specification;
    the long path being longer than a short path through said subgraph;
    wherein said genetic algorithm and said schedule builder interact such that, if said specification is not met, new task permutations are generated and new candidate schedules are produced, for a number of iterations; and
    means for outputting a schedule resulting from said iterations.

16. The system of claim 15, wherein said slabs also have one or more associated soft constraints, and wherein said schedule builder is further operable to evaluate each candidate schedule in terms of violations of said soft constraints and to feed back said evaluation to said genetic algorithm.

17. A computer-implemented method of scheduling slabs to be milled, the slabs having associated pattern constraints, comprising the steps of:
    generating an initial task permutation representing said slabs, using a genetic algorithm;
    representing said task permutation as a directed graph, wherein said tasks are nodes of said graph and edges between nodes are determined by said constraints;

constructing an acyclic subgraph of said graph;

calculating a long path through said subgraph, thereby providing a candidate schedule;

the long path being longer than a short path through said subgraph;

determining whether said long path satisfies a path length specification;

if said path length specification is not met, repeating said generating, representing, constructing, calculating, and determining steps for a new task permutation, for a number of iterations; and outputting a schedule resulting from said iterations.

18. The method of claim 17, wherein said slabs also have one or more associated soft constraints, and further comprising the step of evaluating each candidate schedule in terms of violations of said soft constraints.

19. Logic for scheduling tasks, the tasks having associated constraints, the logic embodied in a computer-readable medium and when executed by a computer being operable to:

generate an initial task permutation, using a genetic algorithm;

represent said task permutation as a directed graph, wherein said tasks are nodes of said graph and edges between nodes are determined by said constraints;

construct an acyclic subgraph of said graph;

calculate a long path through said subgraph, thereby providing a candidate schedule;

the long path being longer than a short path through said subgraph;

determine whether said long path satisfies a path length specification;

if said path length specification is not met, repeat said generating, representing, constructing, calculating, and determining steps for a new task permutation, for a number of iterations; and output a schedule resulting from said iterations.

20. The logic of claim 19, wherein said constraints are pairwise hard constraints.

21. The logic of claim 19, wherein said constraints are hard constraints and wherein said tasks also have one or more associated soft constraints, and further comprising the step of evaluating each candidate schedule in terms of violations of said soft constraints.

22. The logic of claim 19, wherein the logic is operable to construct an acyclic subgraph by constructing said subgraph such that an edge E(i, j) of the subgraph exists only if it is an edge of said graph and either task i is before task j in said task permutation or i and j are in different strongly connected components of said subgraph.

23. The logic of claim 19, wherein the logic is operable to calculate a long path by using critical path techniques.

24. The logic of claim 19, wherein said path length specification is a minimum path length.

25. The logic of claim 19, wherein said path length specification is a maximum path length.

26. Logic for scheduling slabs to be milled, the slabs having associated pattern constraints, the logic embodied in a computer-readable medium and when executed by a computer being operable to:

generate an initial task permutation representing said slabs, using a genetic algorithm;

represent said task permutation as a directed graph, wherein said tasks are nodes of said graph and edges between nodes are determined by said constraints;

construct an acyclic subgraph of said graph;

calculate a long path through said subgraph, thereby providing a candidate schedule;

the long path being longer than a short path through said subgraph;

determine whether said long path satisfies a path length specification;

if said path length specification is not met, repeat said generating, representing, constructing, calculating, and determining steps for a new task permutation, for a number of iterations; and output a schedule resulting from said iterations.

27. The logic of claim 26, wherein said slabs also have one or more associated soft constraints, and further comprising the step of evaluating each candidate schedule in terms of violations of said soft constraints.

* * * * *